(12) United States Patent
Annan et al.

(10) Patent No.: US 6,577,978 B1
(45) Date of Patent: Jun. 10, 2003

(54) MICROPROCESSOR AND MICROCONTROLLER STABILIZED GEOPHYSICAL INSTRUMENTS

(75) Inventors: Alexander Peter Annan, Mississauga (CA); Charles David Leggatt, Toronto (CA)

(73) Assignee: Sensors & Software Inc., Mississauga (CA)

(*) Notice: Subject to any disclaimer, the term of this patent is extended or adjusted under 35 U.S.C. 154(b) by 0 days.

(21) Appl. No.: 09/273,460

(22) Filed: Mar. 22, 1999

Related U.S. Application Data
(60) Provisional application No. 60/078,707, filed on Mar. 20, 1998.

(51) Int. Cl.[7] ............................................. G01F 25/00
(52) U.S. Cl. ........................................ 702/104; 702/56
(58) Field of Search ........................ 702/104, 33, 115, 702/116, 56, 57, 58, 86, 93, 99; 73/766, 708, 862

(56) References Cited

U.S. PATENT DOCUMENTS

| | | | | |
|---|---|---|---|---|
| 4,604,706 A | * | 8/1986 | Fisher, Jr. et al. | 702/15 |
| 4,823,290 A | * | 4/1989 | Fasack et al. | 340/825.01 |
| 5,257,630 A | * | 11/1993 | Broitman et al. | 600/488 |
| 5,477,471 A | * | 12/1995 | Baum et al. | 331/44 |
| 5,901,246 A | * | 5/1999 | Hoffberg et al. | 382/209 |
| 6,216,956 B1 | * | 4/2001 | Ehlers et al. | 236/47 |

* cited by examiner

*Primary Examiner*—Marc S. Hoff
*Assistant Examiner*—Mohamed Charioui

(57) ABSTRACT

This patent embodies the concept of embedding a microprocessor or micro-controller, associated environment sensing transducers, and compensation elements, into every sensor or actuator element of a system which will allow monitoring of the conditions which affect the sensor performance and then provide a means of compensating for such effect.

13 Claims, 4 Drawing Sheets

MICROPROCESSOR AND MICROCONTROLLER STABILIZED GEOPHYSICAL INSTRUMENTS

This application claims benefit to Provisional Application section 60/078,707 filed Mar. 20, 1998.

FIELD OF THE INVENTION

This invention relates to the use of micro-processors and micro-controller in the geophysical environment, and specifically the concept of embedding a micro-processor or micro-controller and the associated environment sensing transducers and compensation elements into every sensor or actuator element of a system.

BACKGROUND OF THE INVENTION

There are many application areas where sensors are used to interact, monitor or generate signals to interrogate the external world. One such class of applications is geophysical instrumentation which use sensors to record natural fields from earth materials or depend on fields actively generated by actuators (sources) in order to interrogate the earth or buildings or other structures in a non-destructive manner. Such sensors are used in a wide variety of environments where temperature, pressure and other factors such as humidity, proximity to other materials, etc., can affect the operation of the sensors or actuators.

In some situations, the sensors, which are used in monitoring systems, can interact with the surroundings. The surroundings will have an effect on how the sensor works and modify the transfer function of the sensor. As a result the response which is observed from the sensor is variable depending on the material which it is in close proximity to.

When either the electronics in the devices themselves change their characteristics with temperature, pressure or any other factor such as voltage or humidity, then the response of the electronics of the system will cause errors in the observed results. Similarly if the sensors themselves have variable transfer functions depending on their means of deployment then the sensor (actuator) response observed will be in error unless the nature of the environment is known and the effect compensated for.

In some situations, the response of a transducer may be non-linear. Compensation can be applied by a micro-controller to linearize by feedback, by altering the sensor characteristics or by digital compensation after/before the sensor/actuator.

Therefore a means of sensing the change or the irregularity in the electronics, devising a digital means of compensating or modifying the output for the irregularity caused, and then providing an embedded control system for changing the overall actuator/sensor response in such a way as to keep it's behavior invariant as its environment changes is desirable

SUMMARY OF THE INVENTION

An object of one aspect of the invention is to provide an improved microprocessor and micro-controller stabilized geophysical sensor and actuator.

Modern microcomputers and micro-controllers as well as peripheral components available in compact and inexpensive low-power circuits may allow for intelligent and adaptive sensors and actuators which may change with the surrounding physical conditions by providing stable (invariant) impulse response or may transfer functions over a wide range of conditions. The term sensor may be interpreted to imply either a sensor or an actuator. An actuator may cause the emission of a signal whereas a sensor detects such a signal.

Historically, geophysical sensors and signal conditioning circuits had to be designed to be insensitive to temperature, pressure and other properties by appropriate selection of components, and/or the use of nulling feedback circuits. In addition, sensor behavior could be affected by the fact that the surroundings influenced the fundamental sensor or actuator properties. For example, the capacitance of a small dipole antenna will change depending on the medium (material) it is placed in/on.

In accordance with one aspect of the present invention, there is provided an improved use of distributed intelligence in two broad but distinct manners.

Preferably the micro-controllers may distributed throughout the sensor and associated support electronics and may be interconnected through a communications bus in the most general situation. The micro-controllers may have the ability to extract information about the surrounding physical environment on a regular basis. The desired sensor behavior (impulse response or transfer function) may be defined. The sensor and associated circuitry response may be measured over the entire range of change of physical conditions anticipated for the sensor when used in real operation.

The micro-controller (possibly with the aid of an external computer) may learn how to adjust controllable circuit components so that the sensor output remains invariant and matches the desired output to within some predefined tolerance. The relationship between external conditions and sensor circuit properties are saved digitally in permanent memory accessible to the micro controller. Once "trained", the intelligent sensor may be used in wide variety of conditions while exhibiting an invariant transfer function.

Conveniently the micro-controllers may operate in two manners; first they can modify the operating sensor circuit or sensor attributes; second, they may operate on the sensor input or output signals to achieve the desired behavior.

The breadth of the concept is enormous. One can easily visualize using this concept for the correction of a sensor that is temperature dependent. A micro-controller with a temperature measurement input and a knowledge of how the sensor output varies with temperature may be used to correct the sensor output with a look up table of correction factors. The most complex application may entail measuring multiple inputs concurrently and combining the results in a variety of fashions throughout a sensor assembly to achieve a desired result.

A major benefit of such systems is that they can be upgraded continually as better and smarter algorithms are devised. Automated training and self-calibration are obvious bi-products.

DETAILWD DESCRIPTION OF THE DRAWINGS

A detailed description of the preferred embodiment is provided herein below by way of example only with reference to the following drawing, in which:

FIG. 5 is a table outlining the different applications of the invention.

Figure 1:
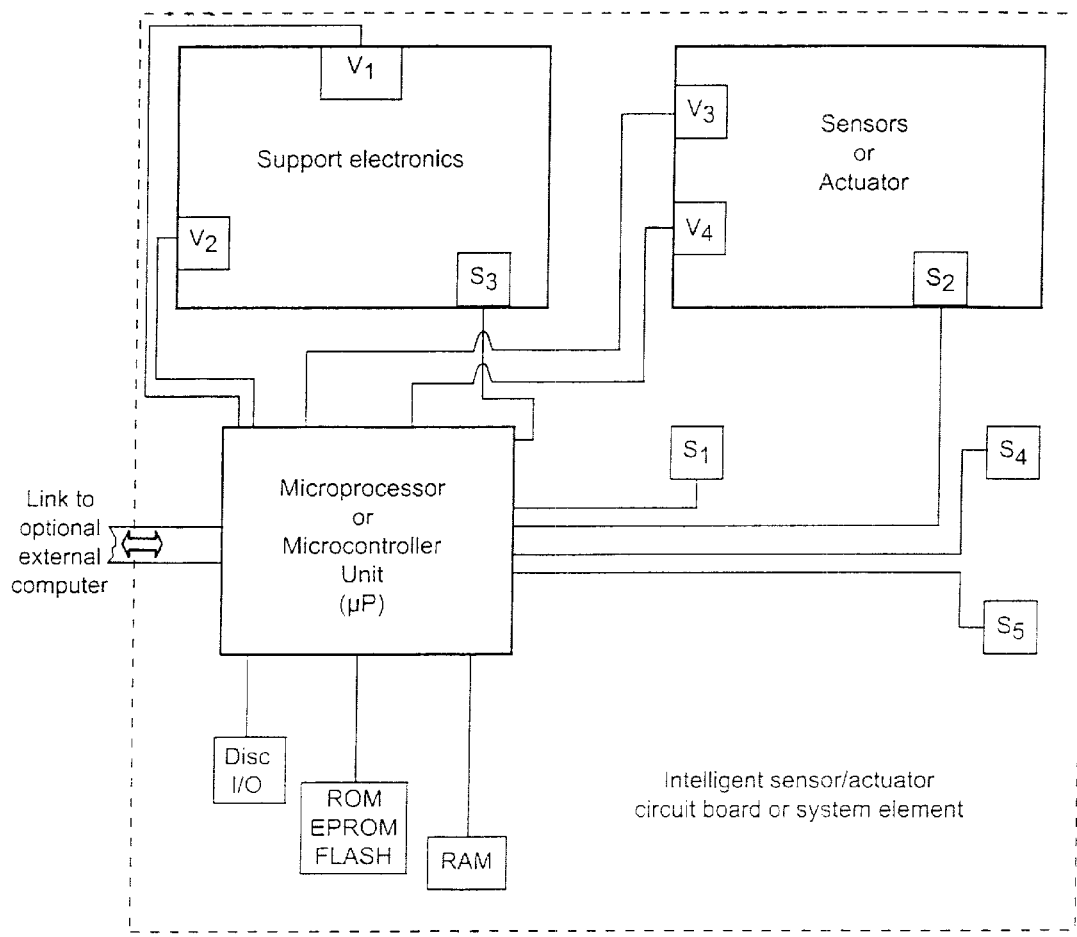
FIG. 1 is a schematic representation of a micro-computer stabilized, compensated or linearized sensor or actuator.

In the drawings, preferred embodiments of the invention are illustrated by way of example. It is to be expressly understood that the description and drawings are only for the purpose of illustration and as an aid to understanding and are not intended as a definition of the limits of the invention.

DETAILED DESCRIPTION OF THE PREFERRED EMBODIMENT

In the description that follows, like parts are marked throughout the specification and the drawings with the same respective reference numerals. The drawings are not necessarily to scale and in some instances proportions may have been exaggerated in order to more clearly depict certain features of the invention.

This patent embodies the concept of embedding a microprocessor or micro-controller, associated environment sensing transducers, and compensation elements into every sensor or actuator element of a system which will allow monitoring of the conditions which affect the sensor performance and then provide a means of compensating for such effect.

FIG. 1 refers to a conceptual block diagram of such a system. This system may be possible in many different. FIG. 1 depicts a sensor subsystem or module comprised of the sensor, associated support electronics and micro-controller which are used to achieve some measurement objective. In an older type sensor, only the sensor and electronics modules would exist and the rest of the elements would not. The other elements in the block diagram are a micro-processor or micro-controller and a number of auxiliary transducers in this case S1 through S5 and a number of controllable variables in this case V1 through V4. (The number of S and V is arbitrary).

The microprocessor continually monitors the signals from the transducers S1 through S5 (in this case) which detect variations in the environment such as temperature, pressure, and voltage, which affect sensor/actuator response. Based on pre-learned or adaptive algorithms, such an empirical best fit calculation or interpolation from a look-up table, the microprocessor will then modify the variables V1 through V4 (again the number of 4 variables is illustrative only) with the purpose of linearizing, balancing or otherwise adjusting sensor/actuator response to achieve invariance.

One could, for instance, think of the output of an electronic stage having a DC level which drifts with temperature. If the DC level changes in a systematic way with temperature, then measuring the temperature of the electronic circuit and putting in an adjustable balancing circuit with feedback from the microprocessor through a digitally controlled voltage source, the continuous monitoring of temperature can be used to keep the DC level of that component constant and invariant with temperature variation.

Because of the very general nature of these concepts, there are a wide variety of uses. One can visualize not just a few, but hundreds of sensors/actuators in a complicated system feeding and controlling literally hundreds of variables. Historically this kind of smart sensor/actuator could not be considered because of the cost and complexity. With small micro-controllers and a wide variety of very compact sensing transducers it is possible now to embed these economically in any type of circuitry.

Incorporation of intelligence into sensors and actuators allows for real time operation without the need for data compensation outside the sensor/actuator components. To do this, there are additional aspects which the microprocessor or micro-controller must have. It has to have the ability to be re-programmed or adaptively learn what kind of adjustments has to be made. The approach can vary from use of a simpler lookup table through to having a very complicated predictive algorithm to monitor and update responses. This patent encompasses all of those concepts and variations that might be embedded in the microprocessor and related support including RAM, ROM and re-writable programs on a media such as $E^2PROM$, Flash RAM, etc.

With proper software, microprocessor compensated sensor/actuators can be trained. In other words, the effect of various properties on an electronics or transducer response may not be know but may have to be learned. By having the microprocessor possess learning capabilities, or having it attached to an external computer and monitoring system, the micro-processor allows for the change in the sensor/actuator response to be measured while the other internal sensors are monitored by the microprocessor. One builds up an observational history of the sensor/actuator response and the internal transducer outputs as the operating environment is adjusted through all anticipated ranges. Examples are raising or lowering the temperature, raising or lowering the pressure, changing the supply voltage.

Once the changes of sensor/actuator response and transducer signals have been monitored for the various inputs, then an intelligent algorithm can be evolved by any number of means, which learns the optimum combination of adjustments to whatever variables are present in the system. The response is then adjusted so that the system becomes invariant despite changes in the surroundings or various properties that previously affected the system.

Such compensation can be achieved by a minimization process whereby the variation of the system response from the desired output is minimized in some optimal sense. Criteria for optimum will vary with the embodiment; in some situations speed of correction may be critical; in others, minimum error may be more important.

Because of the very general nature of the systems which are being disclosed, simple illustrations provide the best means of how the concept can be implemented. Three examples are used to illustrate the inventive concept.

Figure 2:
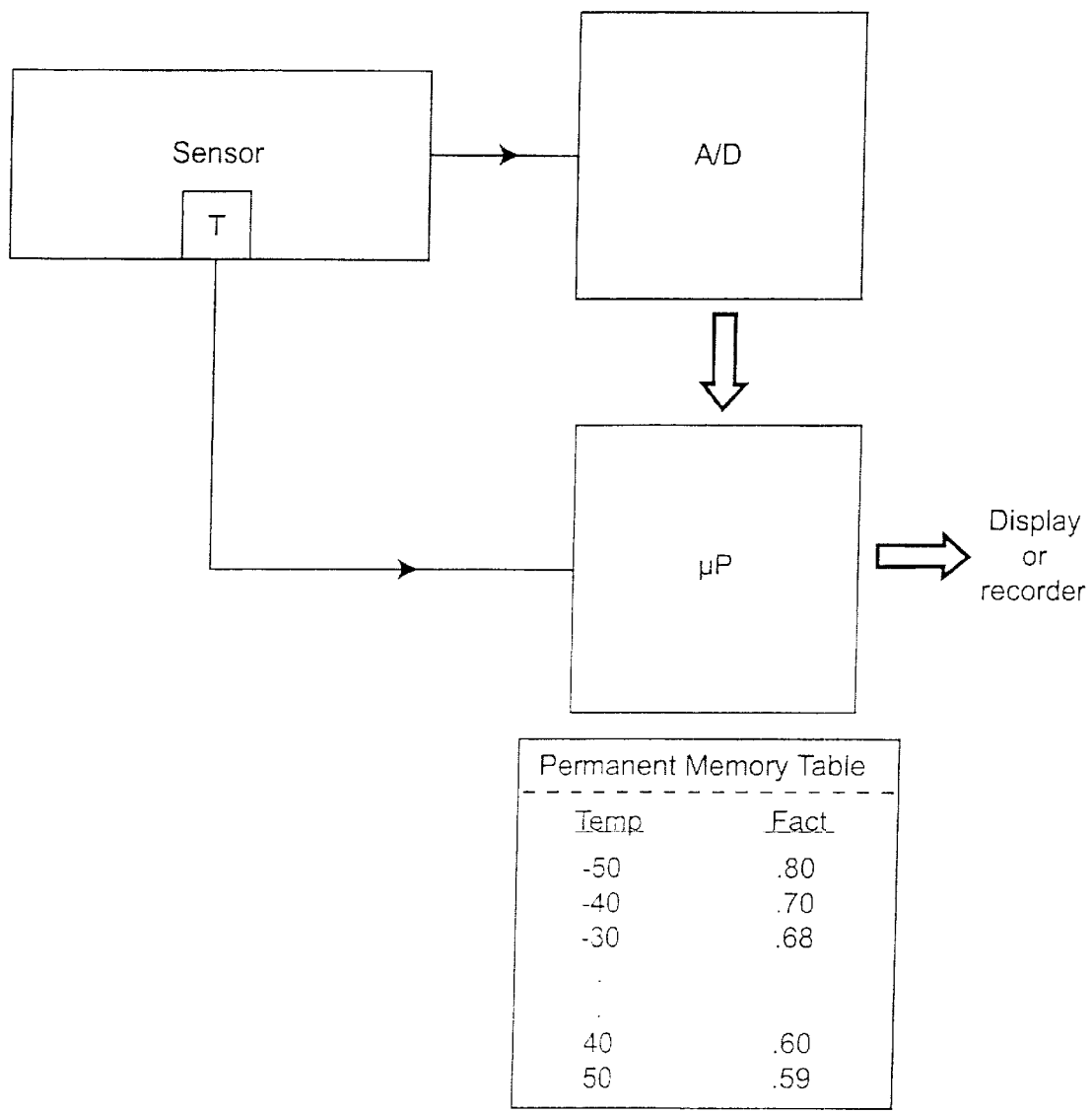
FIG. 2 is a schematic representation of the microcomputer and temperature sensor used to compensate the analog sensor, which has a temperature dependent sensitivity.

FIG. 2 shows an example of a microprocessor and temperature transducer being used to compensate the response of an analog sensor (such as a piezo electric sensor) which has a temperature dependent behavior. This should not be construed as being a limiting description but rather a general description. The sensor could equally be pressure dependent or moisture dependent or supply voltage dependent, etc.

In this particular sensor, the transducer output is fed to an analog to digital (A/D) converter and the digital data are fed to a microprocessor. A temperature transducer is embedded in the sensor and continually provides a temperature out-put which the microprocessor monitors.

The microprocessor uses the temperature to read a tabulated set of data in memory which describes how much the sensor amplitude varies with temperature and then applies a correction factor to the digital data before passing the digital data out for display or recording or use by another system.

This type of operation would be referred to as a digital compensation of a digital signal using a single control transducer. Obviously a wider range of variations on multiple transducers can be easily visualized.

In this case we need a table in memory for compensation. Compensation could also be by a formula whereby the microprocessor computes the compensation based on temperature transducer output values.

Not shown here is the potential of linking the microprocessor to another microprocessor or external computer or external environmental control system, but this should be an implicit aspect of all examples given. Such external connections enable monitoring of both the sensor response and temperature transducer output and facilitate the processor to learn the correct response and creating its own correction tables with appropriate software (firmware) embedded in the microprocessor.

Figure 3:
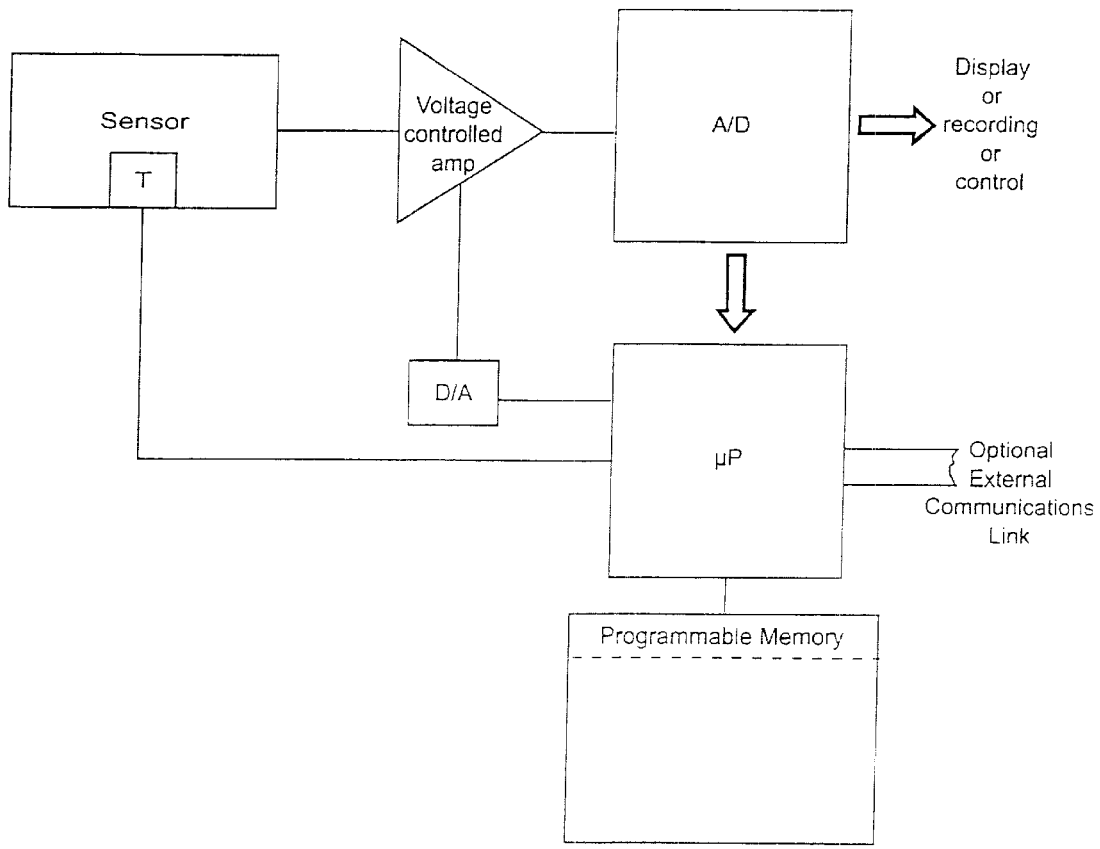
FIG. 3a is a schematic representation of a variation on the temperature compensation depicted in FIG. 2.

A second variation on the concept is shown by the temperature compensation scheme depicted in FIG. 3. In this case, the temperature compensation scheme uses an analog compensation approach.

In the analog compensation approach, the temperature transducer is monitored in exactly the same way by the microprocessor as the previous example. Between sensor output and the desired signal A/D converter, there is a voltage-controlled amplifier, which allows the sensor signal to be amplified or attenuated under the control of an input voltage. The amplifier control voltage is provided by a digital to analog (D/A) converter that is under the control of the microprocessor. The microprocessor reads the temperature, looks up the proper gain voltage from a table and outputs the correct value to the D/A.

In this situation an analog circuit element is digitally controlled by the microprocessor. The corrected data are output for display or recording directly. The microprocessor itself does not interact with the final data path at all.

It is obvious that one can mix the forms of behavior shown in FIGS. 2 and 3 in any number of different ways so they are not mutually exclusive.

As previously disclosed, one can have a compensation table programmed into memory or an algorithm for computing compensation. In addition, there can be extra optional external links to other system components.

Figure 4A:
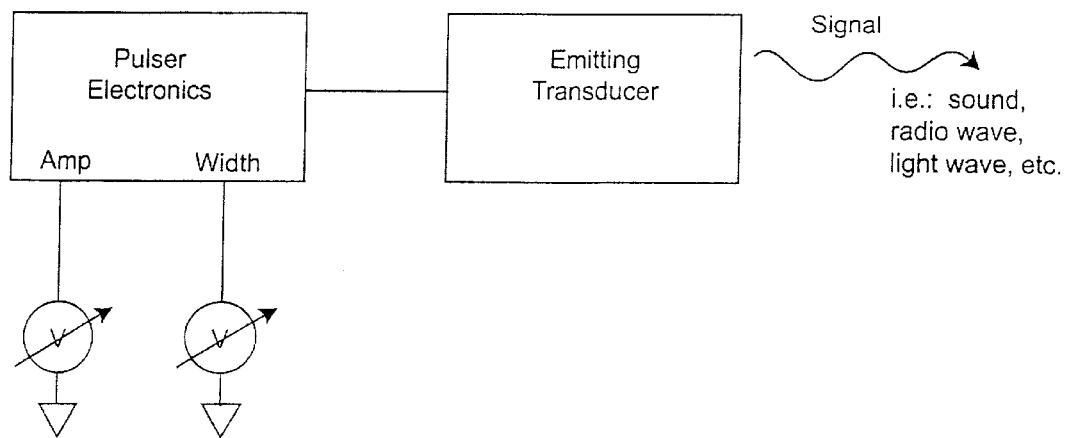
FIGS. 4a and 4b are schematic representations of a pulse driven transducer and a microprocessor for controlling emitted signals.

A further embodiment of the concept is shown in FIG. 4. In this case, we show the same concept for an actuator which emits signals and which is driven by an electronic circuit. In the conceptual drawing shown here a pulse generator circuit provides electrical drive to a piezo electric actuator or an emitting antenna. Any emitter can be envisioned for signals such as sound, radio waves, light waves or other types of signals.

In an earlier implementation of such a circuit (FIG. 4a), one might have analog controls whereby the amplitude and the width of the pulse could be varied with a control knob on the front panel. This would allow the user to adjust the voltages that in turn control the output of the actuator to an optimal state.

Figure 4B:
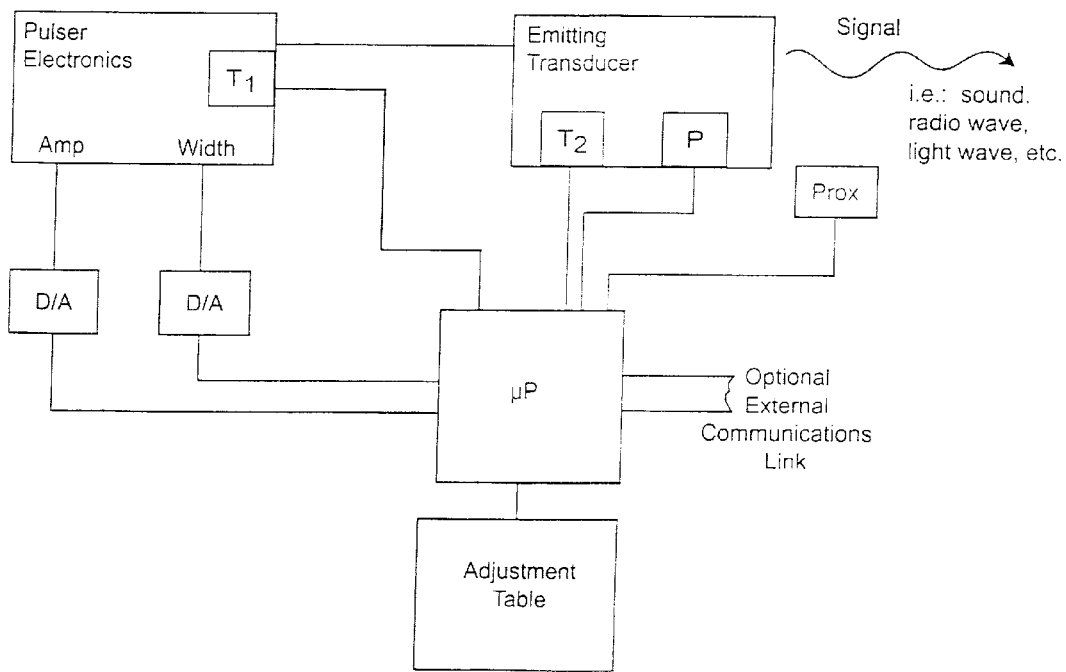

With embedded micro-controllers and transducers, it is possible to develop circuitry whereby the output signal is stabilized automatically. In FIG. 4b we show the new configuration whereby a number of transducers are placed in the system to monitor variations. In this particular figure we use a temperature transducer in the pulsar electronics and a temperature, a pressure and a proximity transducer in the emitting actuator. All of these outputs are monitored continually by the microprocessor. Based on a predefined learning process that is separate from the operation of the system, the microprocessor is trained as to what adjustments to make to keep the actuator output invariant. Actuator control voltages are automatically updated regularly as the input sensors indicate a change in the environment.

The microprocessor can learn how to optimize the actuator output if the whole system is embedded in a test jig whereby the output is monitored by some other sensing circuitry while the behavior of the various transducers within the embedded system are monitored by the microprocessor. The two results are then put into a training system whereby an optimal algorithm for the microprocessor is derived and downloaded into the microprocessor from a master computer system. It is possible in some situations that the microprocessor itself could do its own learning. This possibility is considered just a variation on the concept presented here.

An advanced system could be one with both actuators and sensors containing independent embedded microprocessor control systems that can communicate back and forth. In some circumstances, the actuator output may not be adjustable by simple means. It may prove possible for the sensor (s) to compensate for the variations in the actuator so that the overall signal through the system is invariant. This would entail both of the microprocessor control systems working in unison with communications between the two units. This concept is considered part of the overall concept.

FIG. 5 describes a chart describing a number of different applications that the invention may be applied to, where each application is the desired target.

Various embodiments of the invention have now been described in detail. Since changes in and/or additions to the above-described best mode may be made without departing from the nature, spirit or scope of the invention, the invention is not to be limited to said details.

We claim:

1. An embedded control system for monitoring changing environment conditions for a use selected from a group consisting of agriculture, airports, archeology, biocounting, bridges, building inspection, concrete, conveyer belts, dams, environmental, forensics/police, geotechnical, gravel pits, graveyard, groundwater, hydro/nuclear power, ice/snow, lake/river, military, mining, pipe/sewer, quarries, railroads, real estate, roads, security/customs immigration, smelters, treasure mapping, trenchless technology, tunneling, utility/pipes and wood inspection, comprising:

(a) a microprocessor having a means for modification and compensation to said changing environments;

(b) at least one transducer for detecting and emitting signals from said changing environment;

(c) sensors for detecting or emitting responses;

wherein said microprocessor monitors said signals emitted from said at least one transducer, and said means for modification and compensation to said changing environments modifies and compensates said responses from said sensors thereby compensating for said changing environment and rendering said responses from said sensors invariant and maintained.

2. An embedded control system as claimed in claim 1 wherein said microprocessor can be re-programmed or possesses learning capabilities.

3. An embedded control system as claimed in claim 2 wherein signals emitted from said at least one transducer are digitally modified.

4. An embedded control system as claimed in claim 1, 2, or 3 wherein said signals emitted from at least one transducer are modified using analog control.

5. An embedded control system as claimed in claims 1, 2 or 3 wherein said embedded control system is coordinated using digital interprocess communication.

6. An embedded control system as claimed in claim 1, 2 or 3 further comprising a master processor or independent computer for coordination of said embedded control system.

7. An embedded control system as claimed in claim 1, 2 or 3 wherein said responses from said sensors are modified by digital control.

8. An invariant sensor for a response to a desired target selected from a group consisting of agriculture, airports, archeology, biocounting, bridges, building inspection, concrete, conveyer belts, dams, environmental, forensics/police, geotechnical, gravel pits, graveyard, groundwater, hydro/nuclear power, ice/snow, lake/river, military, mining, pipe/sewer, quarries, railroads, real estate, roads, security/customs immigration, smelters, treasure mapping, trenchless technology, tunneling, utility/pipes and wood inspection, in changing environments comprising:

(c) a microprocessor having a means for response modification to said changing environments;

(d) multiple auxiliary monitoring transducers for detecting and emitting an output signal from said changing environment;

wherein said microprocessor monitors said output signal from said multiple transducers and said means for response modification to said changing environment modifies said response to said desired target.

9. An invariant sensor as claimed in claim 8 wherein said microprocessor is re-programmable.

10. An invariant sensor as claimed in claim 9 wherein a dynamic algorithm is embedded for said desired target.

11. An invariant sensor as claimed in claim 8 wherein said output signal is modified by the digital modification of an electric stream for said desired target.

12. An invariant sensor as claimed in claim 8 wherein said output signal is modified by adjustment to an analog signal path of said desired target.

13. An invariant sensor as claimed in claim 8 wherein multiple microprocessors are connected to multiple sensors by a series of communication links yielding said responses invariant to a desired target.

* * * * *